Patented Nov. 4, 1941

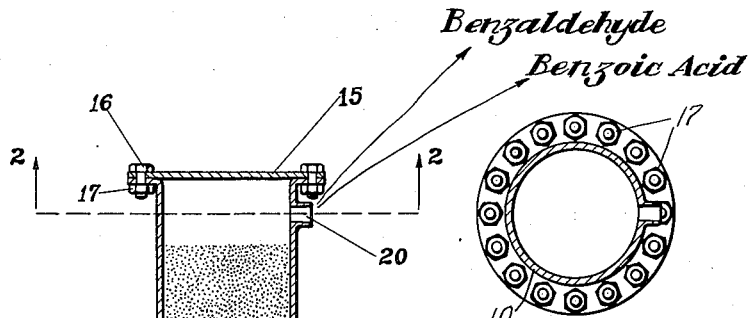
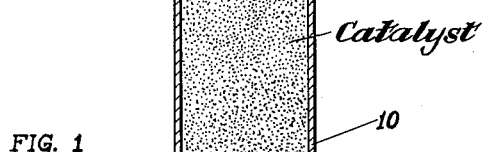
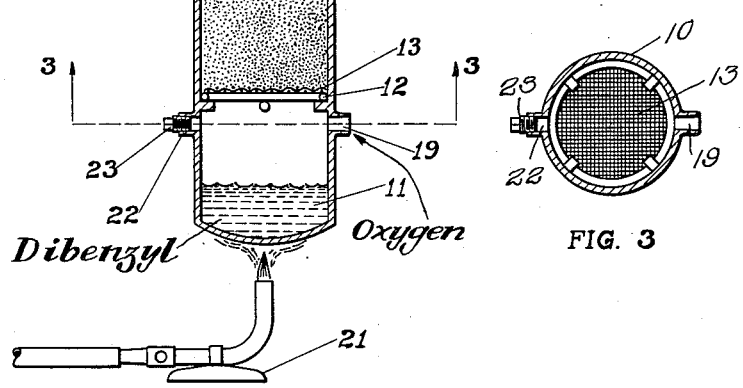

2,261,193

UNITED STATES PATENT OFFICE 2,261,193

PROCESS OF OXIDIZING DIBENZYL

Robert H. Van Schaack, Jr., Evanston, Ill.

Application January 2, 1940, Serial No. 312,052

12 Claims. (Cl. 260—523)

This invention relates particularly to a process for oxidizing dibenzyl to form benzaldehyde, benzoic acid and the like.

Processes for the oxidation of dibenzyl have heretofore been known. However, these processes have been based upon the passage of oxygen or similar oxidizing agent through liquid dibenzyl, either with or without a catalyst to aid the reaction. If no catalyst is used the reaction is very inefficient and unsatisfactory, producing extremely poor yields. On the other hand, if a catalyst is added to the liquid dibenzyl, the reaction proceeds in a satisfactory manner only for a short period of time. The catalyst soon becomes poisoned as a result of being coated with tarry by-products of the reaction. Moreover, since the reaction is preferably carried out at the temperature of boiling dibenzyl (284° C.) and although this is higher than the boiling point of benzoic acid (249.2° C.), the benzoic acid is only slowly and imperfectly distilled off from the dibenzyl and catalyst. As a result, the quantity of benzoic acid in the mixture increases as the reaction proceeds. The presence of the benzoic acid in the mixture rapidly impairs the effectiveness of the catalyst. In addition, another step or operation is necessary to remove the benzoic acid from the dibenzyl.

In my invention I carry out a vapor phase reaction between dibenzyl and a suitable oxidizing agent, preferably in the presence of an oxidizing catalyst. The reaction may readily be carried out by vaporizing dibenzyl at the bottom of a refluxing column containing the catalyst. Oxygen, air or other suitable oxidizing agent is then passed into the lower portion of the column and mixes with the dibenzyl.

The dibenzyl and the oxidizing agent readily react in the presence of the catalyst to form benzaldehyde and benzoic acid. The refluxing of the dibenzyl in the column serves to wash the catalyst free of any tarry by-products which may be deposited thereon, the dibenzyl flowing back to the bottom of the column. The reaction products having lower boiling points than that of the dibenzyl, are carried off at the top of the column and may be collected in a suitable condenser. Under these conditions the benzoic acid formed is almost completely swept off from the catalyst by the benzaldehyde vapors and air.

In the specific embodiment of apparatus for my invention as illustrated herein, Figure 1 is a view of the apparatus partly in elevation and partly in section; Fig. 2 is a view taken along the line 2 of Fig. 1; and Fig. 3 is a view taken along the line 3 of Fig. 1.

In the embodiment of the apparatus shown herein, the column 10 may be made of metal or other suitable material and preferably comprises a substantially cylindrical tube closed at both ends and provided with suitable supporting means (not shown) for holding it in vertical position. The lower portion of the column 10 is adapted to receive a body of liquid dibenzyl 11. The column 10 is also provided with an annular flange 12 in the lower portion of the column and above the liquid dibenzyl. This flange serves to support a mesh screen 13 which, in turn, acts as a support for the catalyst 14.

The catalyst 14 is preferably in granular form and may be used in any desired quantity. Ordinarily, I prefer to use sufficient catalyst to form a bed extending at least one-half of the longitudinal length of the column.

The column 10 may be closed at the top by a cover or closure member 15 which may be secured in position by bolts 16 and nuts 17. The upper end of the column 10 is provided with a small opening 20 which acts as an outlet for the vapors and gas. In the lower portion of the column above the liquid dibzenzyl and below the catalyst bed, an opening 19 permits the introduction of the gaseous oxidizing agent.

Suitable heating means such as the gas burner 21 may be arranged below the bottom of the column to heat the same. If desired, an additional opening 22, provided with a removable closure plug 23, may be located in the lower portion of the column just above the level of the liquid dibenzyl.

In operation, the liquid dibenzyl is introduced to the column 10 through the inlet 22 and the catalyst is placed in position by removing the closure member 15. The closure member is replaced on the top of the column and the apparatus is ready for use. The burner 21 is used to heat the lower portion of the column to a temperature slightly above the boiling point of the dibenzyl. Oxygen or air is then introduced into the column through the opening 19 and mixes with the vaporized dibenzyl in the catalyst bed 14. A substantial portion of the dibenzyl vapor condenses upon the granular catalyst and flows downwardly through the catalyst, passing through the screen and being received in the liquid dibenzyl 11. The reaction between the oxygen and the dibenzyl produces benzaldehyde, benzoic acid and other products. Since benzaldehyde and benzoic acid boil at temperature below the boiling point of the dibenzyl, the vapors of these substances rise to the top of the column and pass out through the opening 20 to a condenser (not shown).

The refluxing action of the dibenzyl and the passing of the uncontaminated liquid condensate through the catalyst serves to wash the catalyst free of tarry by-products of the reaction. The catalyst could, of course, be washed with any other liquid in which these by-products are soluble but the refluxing action is particularly convenient since it permits the washing of the catalyst simultaneously with the reaction process. This latter feature is important since it makes it possible to operate the process continuously, the operator merely adding dibenzyl through the opening 22 at suitable intervals. After the reaction has run for a considerable period of time, it may be desirable to remove the impure dibenzyl from the lower portion of the column and to introduce a fresh batch of the liquid into the column. This is desirable because the tarry by-products have a boiling point higher than that of the dibenzyl and are, therefore, retained in the lower portion of the column when carried there by the refluxing liquid. Any suitable means (not shown) may be provided for draining the column.

The temperature of the column is determined by the temperature of the liquid and vapor of dibenzyl which reflux through the same and, therefore, will not rise above the temperature of the boiling point of dibenzyl (284° C.). In order to carry out the reaction, it is desirable that the temperature of the column be maintained above 150° C. and preferably above 179° C., the boiling point of benzaldehyde. The range of temperatures for the upper portion of the column (the coolest part thereof) is preferably between 179° C. and 230° C. In practice I have found it desirable to use a temperature only slightly above 179° C.

Catalysts for the oxidation of dibenzyl are already known in the art. In my process, any suitable catalyst, such as manganese dioxide, may be used. Other catalysts which may be used include the metals and compounds thereof which are capable of existing in more than one stage of oxidation. Among these are the metals iron, chromium and vanadium. In referring to an oxidizing catalyst, therefore, I mean to include the metals which may exist in more than one stage of oxidation, and compounds of these metals.

Although I prefer to use oxygen or air as the oxidizing agent, it is also possible to use any other suitable gaseous oxidizing agent. I have found that by passing into the column a substantial quantity of the oxygen, the stream of oxygen serves not only to oxidize the dibenzyl but also to carry off substantially all of the benzoic acid which is formed. Thus, although the process is usually carried out at a temperature below the boiling point of benzoic acid, nevertheless, the benzoic acid is carried off in the oxygen, thus eliminating one source of catalyst poisoning.

The use of a substantial quantity of a granular catalyst in the column 10 provides in effect an efficient fractionating column in which the low boiling reaction products are separated from the dibenzyl. As a result, the separation of benzaldehyde and benzoic acid from the dibenzyl is far more complete than could otherwise be obtained. Since a high yield of benzaldehyde is desirable and since benzaldehyde is readily oxidized to benzoic acid if permitted to remain in contact with air or oxygen, this fractionation is also important, in that the benzaldehyde is thereby quickly separated and removed from the field of reaction.

The refluxing of the dibenzyl in the column serves to prevent local heating in the catalyst as well as to wash the tarry by-products thereof. The dibenzyl which is condensed is, of course, not wasted since it is returned to the original batch of liquid and re-distilled.

The yields which are obtained in the use of my process are highly satisfactory. For example, in one run which was made, while maintaining the top of the column at a temperature of approximately 180° C., the condensate was found to contain the following products:

| | Grams |
|---|---|
| Unchanged dibenzyl | 631.2 |
| Benzoic acid | 110.8 |
| Benzaldehyde | 1027.2 |

The process may be operated continuously except for the occasional withdrawal of the undistilled dibenzyl to remove tarry by-products. It is unnecessary to change the catalyst or even to treat it to restore its efficiency. As a matter of fact, the catalyst at the end of a run is just as efficient as at the beginning.

The foregoing specific examples have been given for the purpose of illustrating the invention and means of practicing it. Changes and modifications may therefore be made in the process as set forth, particularly as to quantities of the reagents used and as to the conditions of the reactions, without departing from the spirit and scope of my invention as set forth in the appended claims, in which it is intended to claim all novelty inherent in the invention as broadly as permissible in view of the prior art.

I claim:

1. A process for oxidizing dibenzyl to form benzaldehyde and benzoic acid which comprises introducing dibenzyl vapors with oxygen into a bed of an oxidizing catalyst, and washing the catalyst with an uncontaminated liquid solvent for the tarry by-products of the reaction.

2. A continuous process for oxidizing dibenzyl to form benzaldehyde and benzoic acid which comprises introducing dibenzyl vapor with oxygen into a bed of an oxidizing catalyst, and simultaneously washing the catalyst with liquid dibenzyl to remove therefrom the tarry by-products of the reaction.

3. A process for oxidizing dibenzyl to form benzaldehyde and benzoic acid which comprises introducing dibenzyl vapor with oxygen into a bed of an oxidizing catalyst, condensing unreacted dibenzyl on the catalyst, and passing the condensed liquid dibenzyl through the catalyst to wash the same.

4. A process for oxidizing dibenzyl to form benzaldehyde and benzoic acid which comprises introducing dibenzyl vapor and oxygen into a bed of an oxidizing catalyst at a temperature between the boiling point of benzaldehyde and dibenzyl, condensing unreacted dibenzyl on the catalyst, and passing the condensed liquid dibenzyl through the catalyst to wash the same.

5. A continuous process for oxidizing dibenzyl to form benzaldehyde and benzoic acid which comprises maintaining a body of liquid dibenzyl at the base of a refluxing column, heating the dibenzyl to reflux the same in the column, and introducing air into the lower portion of the column above the liquid dibenzyl, and passing the air upwardly through said column with the dibenzyl vapor whereby the dibenzyl is oxidized, the stream of air being sufficiently large to carry from the column substantially all of the benzoic acid formed in the reaction.

6. A continuous process for oxidizing dibenzyl to form benzaldehyde and benzoic acid which comprises maintaining an oxidizing catalyst at a temperature between the boiling points of benzaldehyde and dibenzyl, introducing dibenzyl and an excess of air into contact with said catalyst, whereby a portion of said dibenzyl flows along the surface of said catalyst to wash the same, and withdrawing from the catalyst excess air and the benzaldehyde formed, said air and benzaldehyde serving to carry off from the catalyst the benzoic acid formed.

7. A continuous process for oxidizing dibenzyl which comprises maintaining an oxidizing catalyst at a temperature below the boiling point of dibenzyl, simultaneously introducing dibenzyl vapor and oxygen into contact with said catalyst, maintaining the dibenzyl vapor in contact with the catalyst long enough for a portion of the dibenzyl vapor to be condensed and withdrawing from the catalyst the benzaldehyde formed in the reaction and oxygen.

8. A continuous process for oxidizing dibenzyl which comprises maintaining a bed of oxidizing catalyst, continuously introducing dibenzyl and oxygen into the catalyst bed, the dibenzyl being present in the vapor and liquid phases whereby the liquid dibenzyl flows along the surface of the catalyst to wash the same, and continuously withdrawing from the bed the reaction products and unreacted dibenzyl and oxygen.

9. A process for oxidizing dibenzyl which comprises maintaining a bed of oxidizing catalyst, introducing dibenzyl and an oxidizing vapor into the catalyst bed, the dibenzyl being present in the vapor and liquid phases whereby the liquid dibenzyl flows along the surface of the catalyst to wash the same, and withdrawing from the bed the reaction products and unreacted dibenzyl.

10. A process for oxidizing dibenzyl to form benzaldehyde and benzoic acid which comprises maintaining a body of liquid dibenzyl at the base of a refluxing column, supporting a catalyst bed within the column above the body of liquid dibenzyl, introducing oxidizing vapor into the lower portion of the column above the liquid dibenzyl and passing the vapor into the catalyst bed, heating the liquid dibenzyl to vaporize the same whereby the dibenzyl is refluxed in the catalyst bed, the dibenzyl being present in the vapor and liquid phases so that the surface of the catalyst is washed by liquid dibenzyl flowing along the same, and withdrawing benzaldehyde and benzoic acid from the upper portion of the column.

11. A process as set forth in claim 10 wherein the oxidizing vapor is oxygen and the temperature at the top of the column is approximately 180° C.

12. A process for oxidizing dibenzyl comprising maintaining a bed of an oxidizing catalyst, passing a gaseous oxidizing agent through said catalyst bed, refluxing dibenzyl in said catalyst bed, the dibenzyl being present in the vapor and liquid phases whereby the liquid dibenzyl flows along the surface of the catalyst to wash the same, and withdrawing from the bed the reaction products and unreacted dibenzyl and oxiding agent.

ROBERT H. VAN SCHAACK, Jr.